United States Patent [19]

Nausedas

[11] 3,890,675
[45] June 24, 1975

[54] PRODUCT STUFFING APPARATUS
[75] Inventor: Joseph A. Nausedas, Chicago, Ill.
[73] Assignee: Union Carbide Corporation, New York, N.Y.
[22] Filed: Aug. 3, 1973
[21] Appl. No.: 385,306

[52] U.S. Cl. ................................................ 17/41
[51] Int. Cl. ............................................ A22c 11/02
[58] Field of Search ............................. 17/41, 33, 35

[56] References Cited
UNITED STATES PATENTS
2,268,119  12/1941  Honstetter et al. ............ 137/514.13
3,621,513  11/1971  Kupcikevicius ........................ 17/41
3,659,317  5/1972   Kupcikevicius ........................ 17/35

Primary Examiner—Louis G. Mancene
Assistant Examiner—Daniel J. Leach
Attorney, Agent, or Firm—M. W. Ryan

[57] ABSTRACT

Apparatus for stuffing product into a flexible casing comprising a stuffing horn having at its discharge end an internal tapered portion. Movably mounted in the bore of the horn is a product stoppering and severing device mating with the internal taper.

2 Claims, 3 Drawing Figures

PRODUCT STUFFING APPARATUS

This invention relates to apparatus for stuffing a viscous, pumpable mass of material into a flexible casing and refers more particularly to the provision in such apparatus of means for insuring positive cut-off of material when the casing operations filled so that in repetitive opreations uniformly stuffed casings are produced.

Although the apparatus of the invention is capable of stuffing a variety of product, it is especially suited to use in stuffing food products and will be described with particular reference to the stuffing of meat products such as cold hamburger grinds, dried beef formulations, and coarse cut product such as turkey "logs" or rolls of white and dark meat mixes. The flexible casing used for such products may be any of the conventionally used food casings including bags composed of plastic film such as polyvinylidene chloride.

Several satisfactory methods and apparatus are available to the industry for sausage production in the smaller sizes, frankfurters particularly, and also for large casing stuffing to produce bologna, salami, liverwurst and the like products. Generally these processes are worked in areas maintained at or near normal interior room temperatures and function well in such conditions. If, for one reason or another, the process ambient temperature or the temperature of the product emulsion is lowered, it is not lowered to freezing levels. Fresh meat processing, however, is conducted in cold rooms where ambient temperatures are maintained at or near freezing to insure meat freshness. Fresh meat in packaging process generally has not had the preservatives added which would permit handling at higher temperatures.

In attempting to adapt presently available viscous food stuffing technology to cold room operations, typically continual semiautomatic bagging of ground fresh meats, problems have been encountered. Methods and apparatus which work satisfactorily at or near normal room temperatures are found to produce less than satisfactory results in cold rooms. The U.S. Pat. No. 3,553,769 to Myles et al and U.S. Pat. No. 3,621,513 to Kupcikevicius, assigned to the same assignee as this application, illustrate the stuffing technology under discussion. The major problems encountered are attributable to the effect of the lower temperatures of the cold room on the packaging bags used. Bags which are soft and pliable and easily handled through end closure and clipping steps in room temperature processes become relatively stiff and brittle and tend to crack and tear during the performance of these same operations in cold rooms. Cold room stuffing of fresh ground meat also involves a product which is significantly more viscous and rather particulate in form and thus quite a bit different in character from the smooth easy flowing emulstions normally encountered in conventional sausage stuffing. Thus it has been found difficult with known techniques to obtain good clean product-free closure zones where sealing clips can be applied adjacent the open ends of just filled bags.

In some stuffing apparatus a product stoppering and severing device is mounted adjacent to the discharge end of the stuffing horn. During stuffing this device is inside the casing. When the casing is full, the device is moved into engagement with the external extremity of the discharge end of the horn to stop the flow of product from it. Such apparatus is eminently satisfactory for stuffing material of substantially uniform particle size, but when the material contains a mixture of fine material and large chunks, problems have been encountered.

For example, casings stuffed with such a mixture on such apparatus have been found to contain large voids and non-uniform distribution of the larger particles of product. The cause of these deficiencies is attributed to displacement of the stoppering device within the casing during stuffing. As the stopper is displaced from the central axis of the casing to one side or the other, most of the product is diverted and compacted into about two-thirds of the casing cross-section. The other portion of the casing cross-section, that occupied by the stopper, does not receive a proper proportion of solid chunks of product, and thus is not completely compacted.

It is the principal object of this invention to overcome the disadvantages of prior art apparatus. More specifically, an object of the invention is the provision of apparatus in which a stoppering device is self-aligning and is not displaced by chunks of material in product being stuffed.

The invention by means of which these objects are attained will be described with reference to the accompanying drawing, in which.

The apparatus of the invention comprises a stuffing horn having a conventional inlet end and product pumping means. The discharge end of the stuffing horn is conically tapered on its internal surface and may also be conically tapered externally. Movably mounted within the bore of the stuffing horn is a stoppering device having a tapered portion adapted to mate with the internal tapered portion of the discharge end of the stuffing horn. A cutting edge may be provided on the stoppering device adapted to engage and sever chunks of product when the stopper is moved into engagement with the internal tapered portion of the horn. Adjacent to the external portion of the discharge end of the stuffing horn, but spaced from it, there may be mounted a casing holdback device so contoured as to provide with the discharge end of the stuffing horn a passage for slipping of casing off the horn as prodduct is stuffed into it. The apparatus also includes a casing clipping device mounted adjacent to the discharge end of the stuffing horn.

Figure 1:
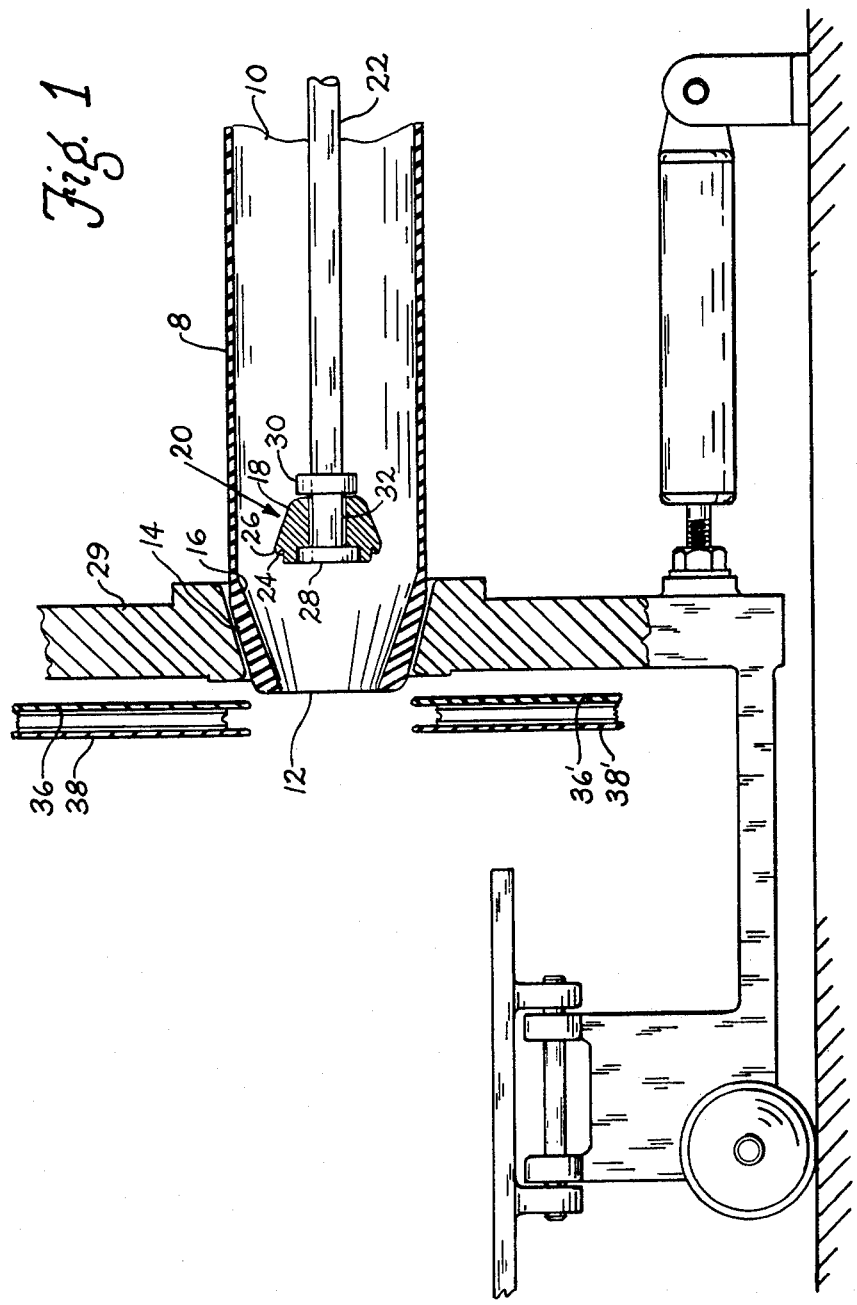
FIG. 1 is a vertical section of a portion of apparatus embodying the invention, shown in position for stuffing product.

Referring now to the drawing, there is shown in FIG. 1 the discharge end 8 of a stuffing horn having an internal bore 10 and a discharge orifice 12. The inlet end and pump which may be of conventional design are not shown. Extending rearwardly of the orifice 12 are a section 14 on the external portion of the discharge end 8 and a conically tapered section 16 on the internal portion thereof. As shown, the external section 14 is conically tapered, which is a preferred construction, but the section 14 may be untapered. Also as shown the tapered sections 14, 16 are not parallel, although they may be.

Within the bore 10 of the stuffing horn a product stoppering and severing device shown generally at 20 is mounted on a centrally positioned connecting rod 22, the rod 22 being longitudinally movable within the bore 10. At the end of the rod 22 nearer the orifice 12 a shoulder 28 is provided, and mounted on the rod 22 aft on the shoulder 28 is the stopper 20. The aft portion 18 of the stopper 20 is of streamlined configuration to permit ready flow of product past it. The fore portion has a tapered section 26 designed to mate with the internal tapered portion 16 of the discharge end 8 of the stuffing horn. A knife edge 24 is also provided on the fore portion of the stopper 20. Aft of the stopper 20 on the rod 22 is an adjustable collar 30. The stopper 20 has a bore 32 slightly larger in diameter than the diameter of the rod 22, and the fore portion of the stopper 20 receives the shoulder 28. Thus, the stopper 20 is loosely secured between the shoulder 28 and the collar 30 so as to permit its alignment with the internal tapered portion 16 of the discharge end 8 of the stuffing horn.

Adjacent to the external portion 14 of the discharge end 8 of the stuffing horn is a casing holdback member 29. As will be later described, the member 29 and the portion 14 are not in contact with each other but provide a passage for a casing. In the embodiment shown both the portion 14 and the member 29 are tapered, and their tapers are, of course, parallel. Adjacent to the discharge orifice 12 is a conventional casing clipper only the plates 36, 38 of which are shown.

Figure 2:
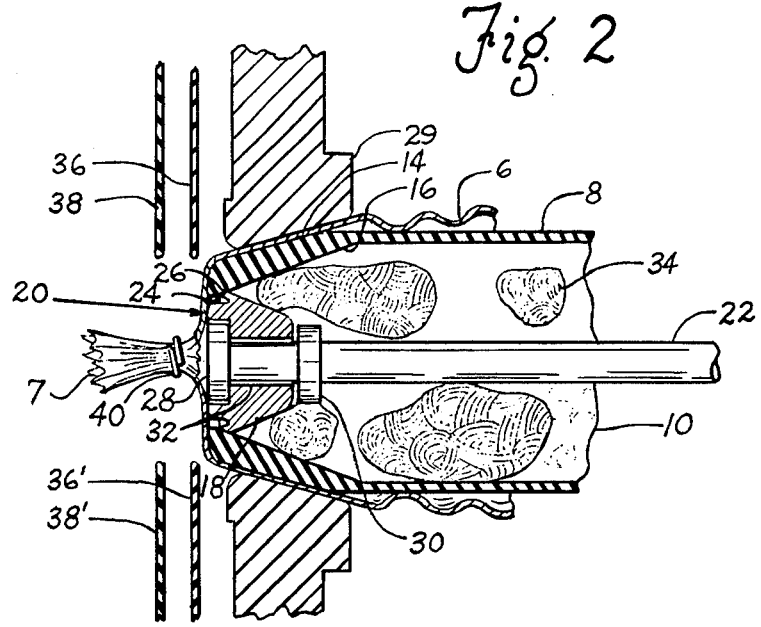
FIG. 2 is a similar view part being cut away showing the apparatus of FIG. 1 in position at the start of a stuffing operation.
Figure 3:
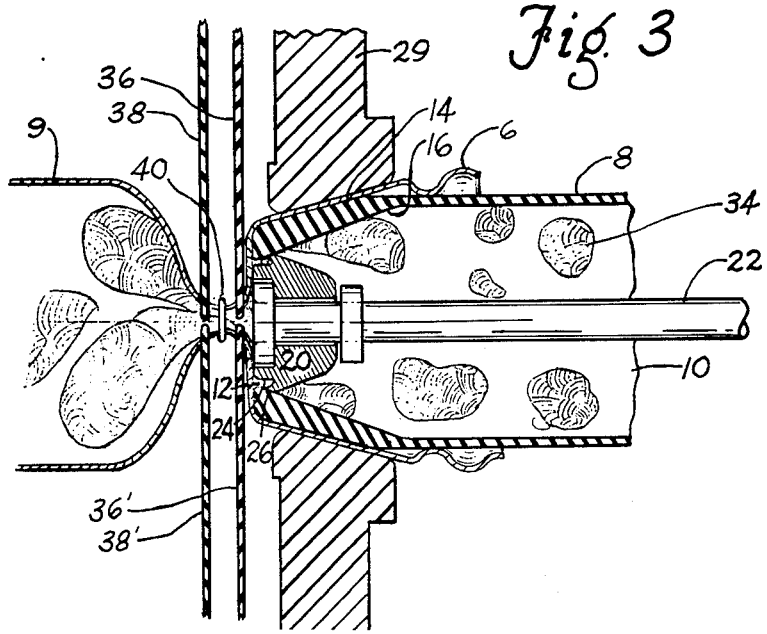
FIG. 3 is a view similar to FIG. 2 showing the apparatus of FIG. 1 at the end of a stuffing operation.

Turning now to FIGS. 1, 2 and 3, the operation of the apparatus of FIG. 1 will be described. An unfilled casing 6 is slipped over the discharge end 8 of the stuffing horn, its fore end 7 being closed by a clip 40. As the meat emulsion, containing chunks 34 is pumped into the casing 6, the casing slips between the member 29 and the external portion 14 of the stuffing horn. The meat product flows freely past the streamlined portion 18 of the stopper 20 and into the casing to expand it to its full width, shown at 9. When a predetermined quantity has been stuffed into the casing, the rod 22 is actuated to move the stopper 20 into engagement with the internal tapered portion 16, stopping the flow of meat product and severing any chunk 34. The clipper is then actuated to close the casing with a conventional clip 40.

The diameter of the stoppering means 20 is chosen with regard to the diameter of the bore 10 of the stuffing horn. Specifically in the embodiment shown, when the stopper 20 is retracted as shown in FIG. 1 the difference between the cross-sectional area of the bore 10 and the net free flow cross-sectional area around the stopper is approximately twice the area of the horn at the discharge orifice 12. Therefore as the horn passage decreases in cross-sectional area, the speed of product flow increases and thus provides a desired compact, mixed flow into the casing.

Apparatus embodying the invention has been tested under field conditions wherein meat product containing chunks of meat in finely divided meat emulsion are stuffed into plastic bags at temperatures approximating 40°F. Although such conditions are those which have produced the problems above discussed, the apparatus performed to complete satisfaction, producing uniformly stuffed casing substantially free of voids.

What is claimed is:

1. Apparatus for stuffing a viscous pumpable product into a flexible casing, which apparatus comprises
   a. a stuffing horn having an inlet end and a discharge end for said product, said discharge end having an external portion and an internal tapered portion;
   b. a movable product stoppering means internally mounted in said stuffing horn and having a tapered portion adapted to seat against the internal tapered portion of said discharge end and a circumferential knife edge in advance of said tapered portion thereof;
   c. means for advancing product to be stuffed through said horn; and
   d. means for moving said stoppering means into and out of engagement with said internal tapered portion.

2. Apparatus as defined by claim 1 in which said stoppering means is loosely secured on said stopper-moving means.

* * * * *

UNITED STATES PATENT OFFICE
CERTIFICATE OF CORRECTION

Patent No. 3,890,675            Dated June 24, 1975

Inventor(s) Joseph A. Nausedas

It is certified that error appears in the above-identified patent and that said Letters Patent are hereby corrected as shown below:

IN THE SPECIFICATION:

Column 1, line 7, change "operations" to --is--.

Signed and Sealed this ninth Day of September 1975

[SEAL]

Attest:

RUTH C. MASON
*Attesting Officer*

C. MARSHALL DANN
*Commissioner of Patents and Trademarks*